United States Patent [19]

Kannady et al.

[11] 3,985,253

[45] Oct. 12, 1976

[54] LARGE HAY BALE CARRIER

[75] Inventors: James W. Kannady; Francis W. Kannady, both of Bixby; Charles W. Browning, Tulsa, all of Okla.

[73] Assignee: James W. Kannady, Bixby, Okla.

[22] Filed: Mar. 22, 1974

[21] Appl. No.: 453,707

[52] U.S. Cl. ................................ 214/506; 298/5
[51] Int. Cl.[2] ........................................ A01D 90/08
[58] Field of Search ............... 214/506, 500, 352; 298/5, 20 R

[56] References Cited
UNITED STATES PATENTS

| 832,240 | 10/1906 | Constable | 298/5 |
|---|---|---|---|
| 3,421,644 | 1/1969 | Butcher | 214/500 |
| 3,450,281 | 6/1969 | Groberg | 214/352 |

FOREIGN PATENTS OR APPLICATIONS

| 807,751 | 7/1951 | Germany | 298/5 |
|---|---|---|---|
| 304,328 | 1/1933 | Italy | 298/5 |

*Primary Examiner* — M. H. Wood, Jr.
*Assistant Examiner* — John A. Pekar
*Attorney, Agent, or Firm* — Head, Johnson & Chafin

[57] ABSTRACT

A carrier frame for large cylindrical bales of hay is adapted to be connected to a towing vehicle and includes latch mechanisms operable from the towing vehicle to tilt the carrier frame into position about the bale of hay, cause same to be moved into the carrier frame or dumped therefrom and returned to the towing position.

10 Claims, 13 Drawing Figures

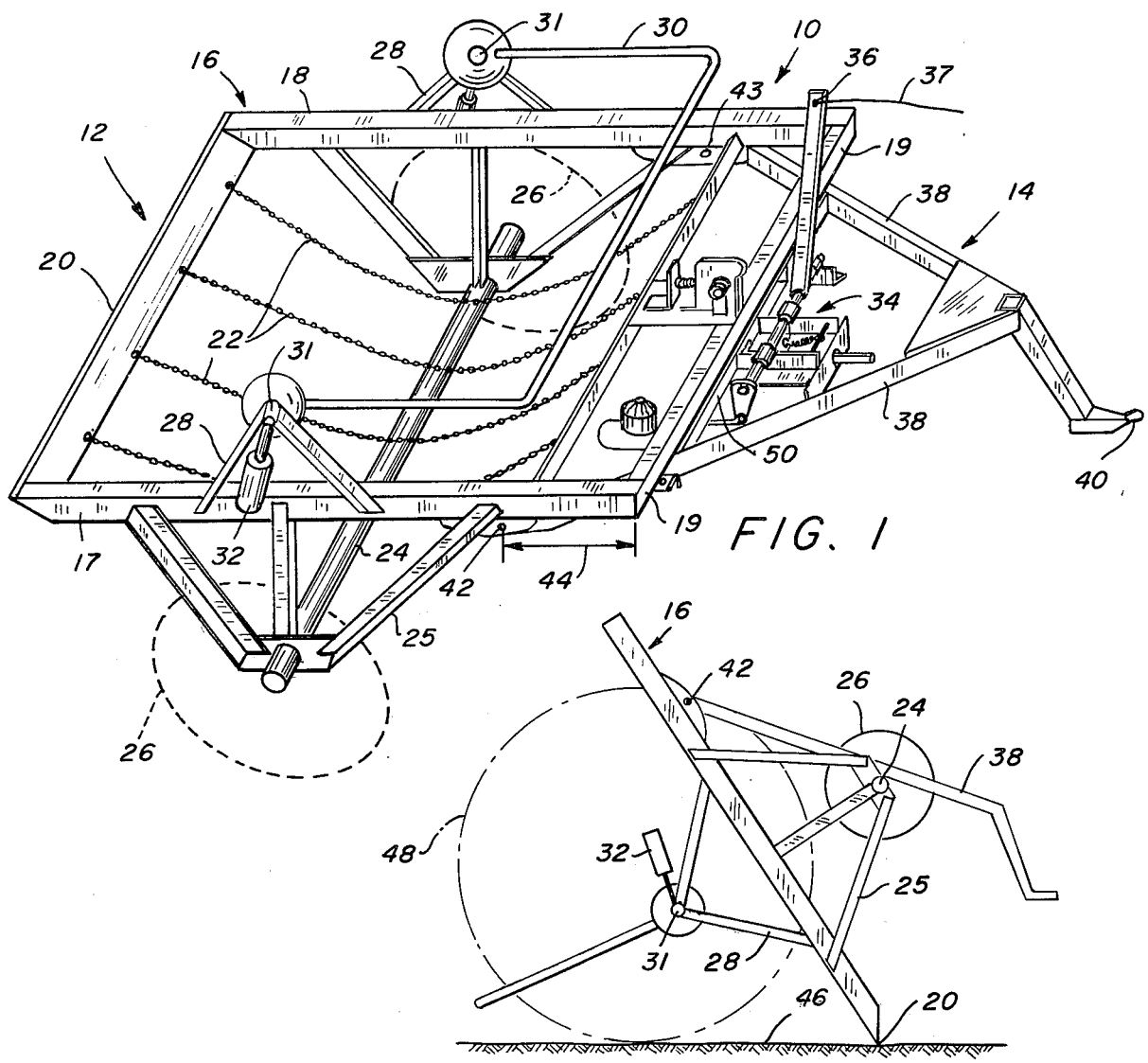
FIG. 1
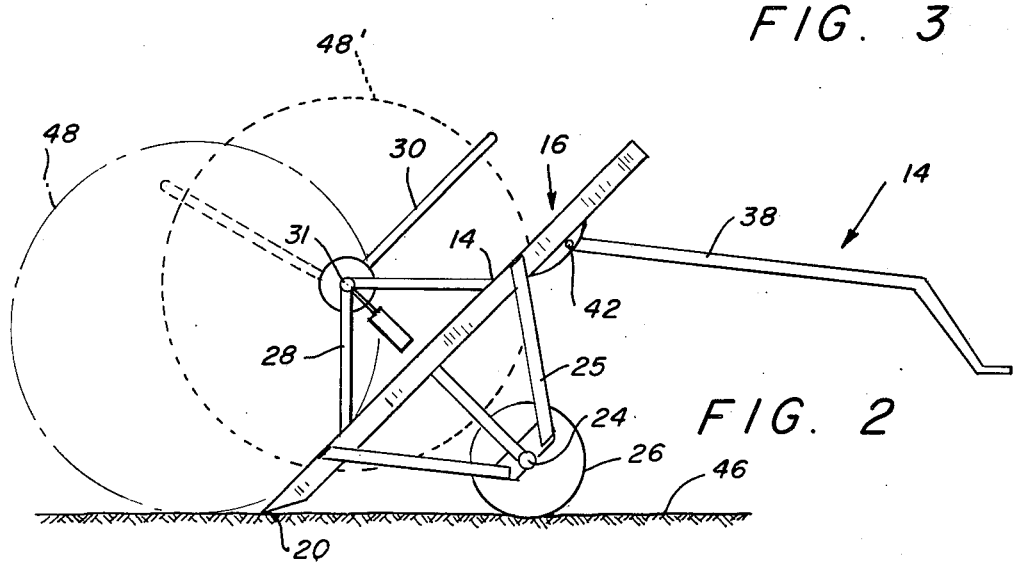
FIG. 3
FIG. 2

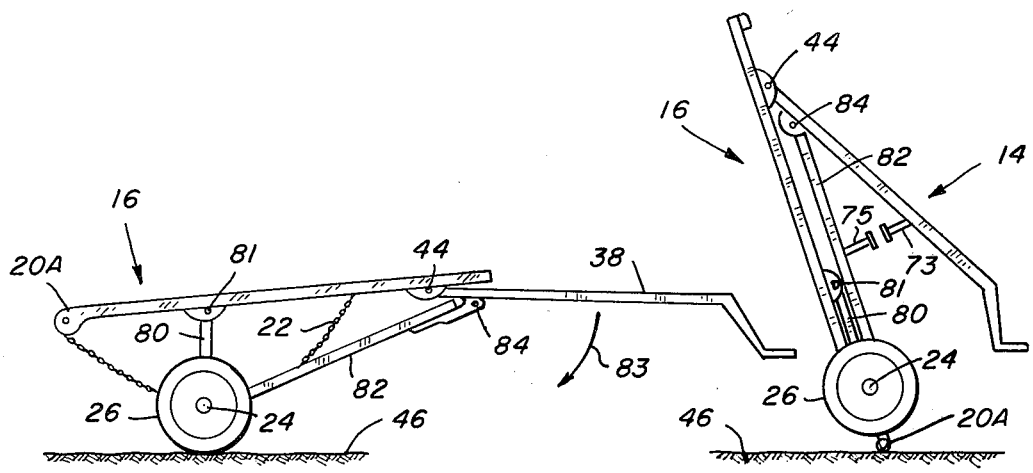
FIG. 5
FIG. 7
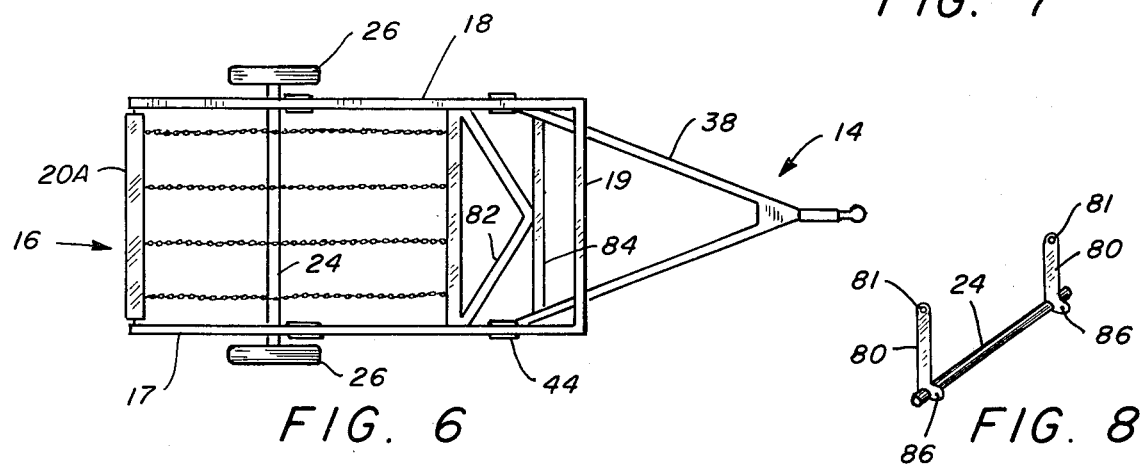
FIG. 6
FIG. 8
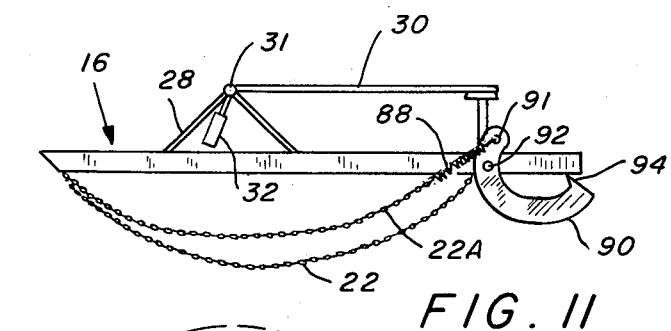
FIG. 11
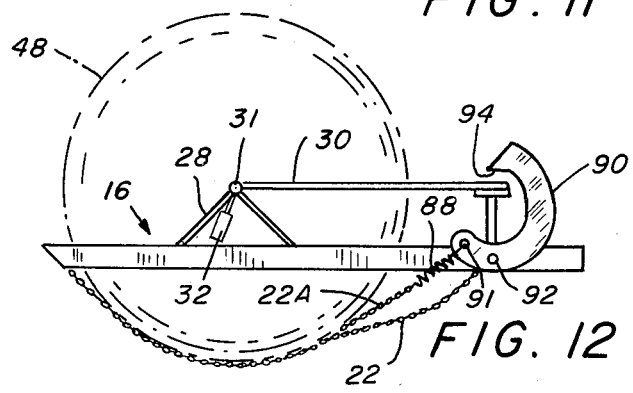
FIG. 12
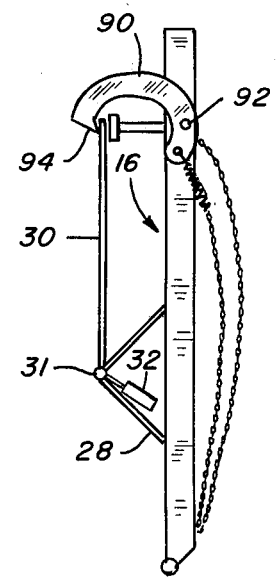
FIG. 13

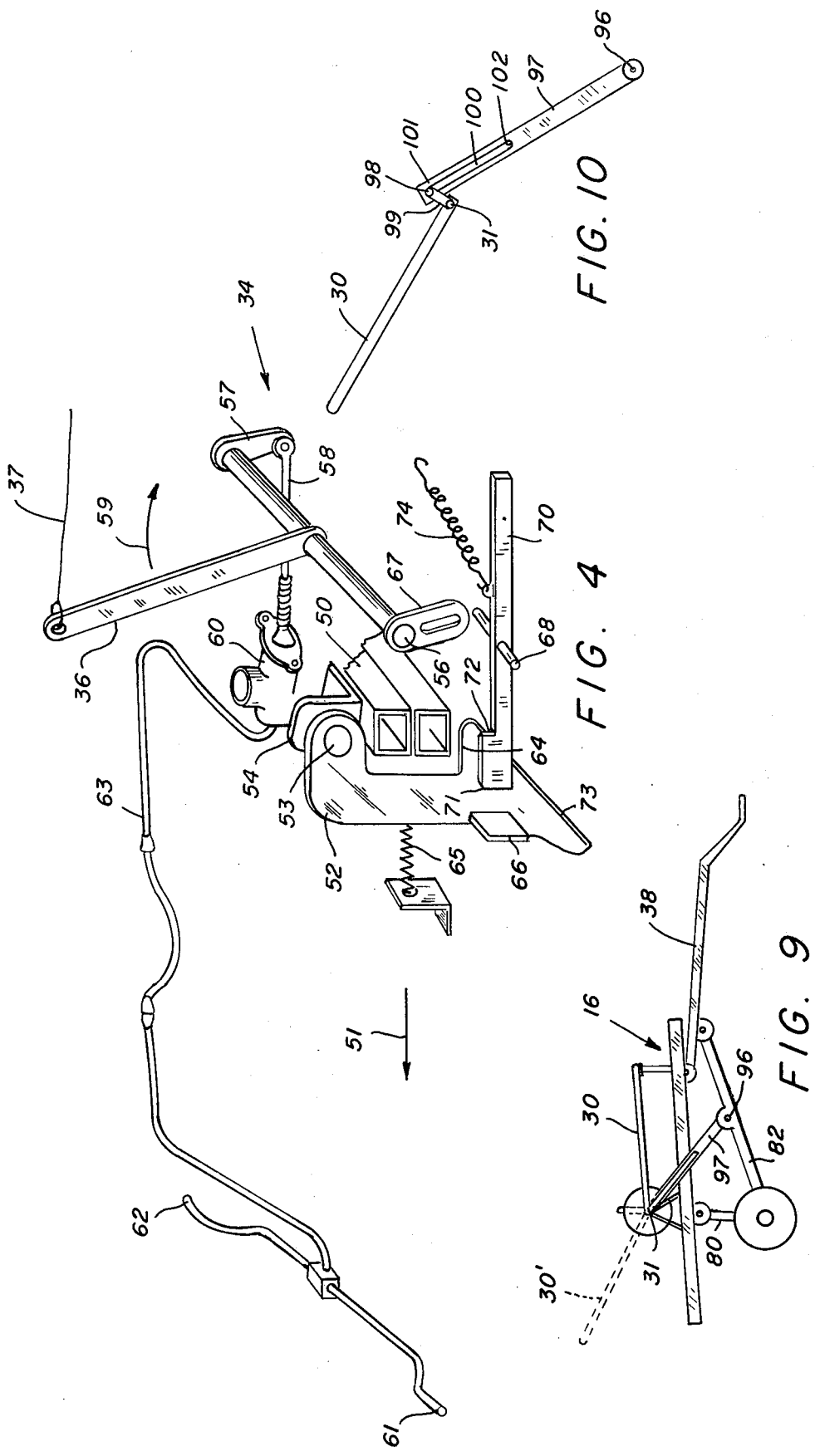

LARGE HAY BALE CARRIER

BACKGROUND OF THE INVENTION

This invention lies in the field of trailers for carrying large heavy cylindrical objects such as bales of hay. Currently balers are creating bales measuring 5 to 7 feet in diameter and 5 to 6 feet wide. More particularly, it involves a trailer design which can be attached through a hitch frame to a towing vehicle such as a pick-up truck or tractor. Still more particularly, it concerns a design of trailer which can be backed up to a cylindrical bale of hay resting on its cylindrical surface on the ground. The trailer, which is made in two parts, can be unlatched so that the carrier frame will tilt back about the wheels until the back portion of the frame is on the ground and the assembly is moved backwardly to the bale of hay, the frame is tilted still further until it goes past the vertical. A bail, made from a steel rod is hingedly attached to the frame and is normally carried in a position where it extends to the front of the frame and is essentially parallel to the plane of the frame. When the carrier frame is tilted and positioned over the bale of hay the bail is released and falls into a more or less horizontal position toward the rear of the carrier frame, locking itself around the bale of hay. Movement of the trailer hitch to the front causes the frame to rotate towards the front, carrying and lifting the bale with the frame until the wheels rest on the ground and the bale of hay is securely seated within the frame, resting on support means such as chains, ropes or metal strips, etc.

The design of the carrier frame, axle and wheel structure, the hitch frame and the latch means are such that by operating the unlatching lever, (which can be done from the carrier vehicle by means of rope or chain) opens the latch, sets the brake, and locks the brake in an on position. Thereafter, simple maneuvering of the towing vehicle by backing it up to the proper point and pulling it forward at the proper time, will pick up the bale of hay and lock it into the frame, turn the frame back into a horizontal position, latching the carrier frame to the hitch frame and releasing the brakes, so that the carrier frame and the load are now in condition for traveling.

In the prior art means have been provided for carrying bales of hay in a trailer but have required generally extraneous means for guiding the frame to the bale of hay and for attaching the bale of hay to the trailer frame and for tilting the trailer frame back into a horizontal position by means of winches and cable, etc.

SUMMARY OF THE INVENTION

It is an object of this invention to provide a self-contained trailer mechanism comprising essentially two frames, a carrier frame and a hitch frame, the latter hingedly supported to the underneath portion of the carrier frame. The hinge axis is positioned rearwardly of the front edge of the frame. Wheels are provided at about the center of the frame with means provided to support a bale of hay within the carrier frame. Latch means are provided which can be operated by a tension member, such that pulling on the latching lever will cause the latch which holds the carrier frame and the hitch frame together to be released. This operation simultaneously causes the brakes to be set on the two wheels of the trailer, and simultaneously locks the brakes on, until the latch again closes. Simple maneuvering of the trailer by means of the towing vehicle will cause the frame to tilt backward once it is unlatched and as the towing vehicle goes backward will cause the frame to tilt backward once it is unlatched and as the towing vehicle goes backward will cause the frame to lock under the bale of hay. Further backing of the towing vehicle will cause the frame to rise and fall over the bale of hay.

A locking bail carried on the carrier frame can be rotated either by gravity or by mechanical linkages to lock around the bale of hay. Thus by pulling forward, the bale will be lifted as the carrier frame rotates in a forward direction until the wheels rest on the ground. The wheels being locked by the brake tend to drag on the ground so that further pulling by the towing vehicle causes the frame to rotate further into a horizontal position, whereby the carrier frame is latched to the hitch frame. When the latch closes the brakes are released and the load is ready for transport.

BRIEF DESCRIPTION OF THE DRAWINGS

These and other objects and advantages of this invention and a better understanding of the principles and details of the invention will be evident from the following description taken in conjunction with the appended drawings in which:

FIG. 1 illustrates an overall view of the apparatus of this invention.

FIGS. 2 and 3 show the relative position of the carrier frame, the hitch frame and the hay bale at two positions in the loading operation.

FIG. 4 provides details of the latching mechanism and the brake system which is applied during the loading operation.

FIGS. 5, 6 and 7 show an alternate embodiment in which the wheels are attached to the carrier frame, not by a rigid framework, but by a hinged arm system and are locked in a vertical position while traveling by means of a linkage tied to the hitch frame.

FIG. 8 shows a detail of the axle linkage.

FIGS. 9 and 10 show details of a mechanical linkage to control the bail.

FIGS. 11, 12 and 13 show a mechanism for locking the bail in its traveling position by means of a mechanism responsive to the weight of the bale of hay in the frame, so that during traveling and unloading, the bail will be locked in its traveling position so that the bale of hay can be dumped from the carrier frame.

DESCRIPTION OF THE PREFERRED EMBODIMENT

Referring now to the drawings and in particular to FIG. 1 the numeral 10 indicates generally the bale carrier system of this invention. It comprises two parts, a bale cradle and carrier frame means indicated generally by the numeral 12 and a hitch frame means indicated generally by the numeral 14. The bale carrier frame is indicated generally by the numeral 16 and comprises essentially a rectangular frame having two side rails 17 and 18 and a front rail 19 and a rear or back rail 20. The description of front and rear are derived from the fact of the direction in which the vehicle normally travels. The carrier frame means 16 includes a rigid support means 25, by means of which the frame 16 is supported on an axle 24 which is parallel to the front and rear frame members 19 and 20. Wheels 26 are provided and supported on the axle by conventional means. These wheels can have a brake mechanism which can be electrical, mechanical or hydraulic as desired, so that during a selected time interval the brakes can be locked to prevent the wheels from turning.

A hitch frame 14 is provided which is swiveled to the underside of the carrier frame 16 at two points 42, 43 which define an axis parallel to the wheel axis. The hinge or pivot axis 42, 43 is spaced back from the leading edge of the frame 16 a distance 44 which is selected value, designed for a purpose which will be clear as the description continues.

The hitch frame 14 has members 38 and other parts which are normal to hitch frames in general, including means 40 for attachment to the towing vehicle.

There is a latch mechanism indicated generally by the numeral 34 which will be described in greater detail in FIG. 4, which ties together the leading edge 19 of the carrier frame and a transverse bar 50 of the hitch frame. When locked together the carrier frame 16 is held in a substantially horizontal plane and the bale of hay will be resting in the opening inside of the frame 16 and will rest on a plurality of means such as 22 which might be flexible tension members such as ropes of chains, or might be substantially rigid straps, etc. contoured to the shape of the cylindrical bale.

A bail 30 which is formed of a steel rod, or similar material, is supported for rotation about an axis 31 which is supported by a rigid framework 28 attached to the rails 17 and 18, respectively. The normal position of the bail 30 is in a horizontal position directed to the front end of the carrier. It is held in that position by a counterweight 32 or other means, such as will be described in connection with FIGS. 9 and 10.

Refer to FIG. 4 for a further discussion of the latching mechanisms shown generally by the numeral 34 in FIG. 1 and FIG. 4.

The hitch frame carries a transverse bar 50. A latch mechanism comprising a support member 54. A latch plate 52 which is hinged to the support member 54 by hinge pin 53. The latch plate 52 has a tongue 64 which is adapted to catch under the transverse member 50 and is urged by a compression spring 65 to move in a forward direction, and to latch under the bar 50. The latch plate 52 and spring 65 are attached to the carrier frame. The transverse bar 50 is part of the hitch frame. Thus, when the latch plate is in the position shown the carrier frame and the hitch frame are latched together. There is a sliding arm 70 which has a back end 71, which when it moves toward the rear (the arrow 51 indicating the direction toward the rear) strikes the plate 66, which is part of the latch plate 52, and forces it to the rear, unhooking the tongue 64 from beneath the transverse bar 50 and releasing the carrier frame from the hitch frame. The arm 70 is moved to the rear by means of a link 67, in conjunction with pin 68 and a lever system comprising an arm 36, a horizontal rod rotatable about an axis 56. A flexible tension member 37 can be used to pull the operating lever 36 in a direction to the front, shown by arrow 59. When the member 36 moves to the front, the link 67 moves to the rear pushing the lever 70 to the rear to release the latch plate 52. At the same time, the link 57 and rod 58 press on the hydraulic brake mechanism 60, which can be a conventional brake system, which provides pressure fluid through the line 63 to the brakes connected at the point 61 and 62. The brakes can be hydraulic or mechanical and all of the brake mechanism is conventional, and needs no further description.

When the arm 70 moves to the rear and releases the latch plate 52, it is lifted by means of the spring 74 so that the edge 72 will catch on the back corner of the transverse bar 50 and will keep the operation rod 70 in a rear position. This will keep the lever 36 in a forward position and will keep the brake energized by means of the linkage 57, 58. Thus, in one operation of pulling on the tension member 37, which can be a cord or chain that runs to the towing vehicle. The operator, without getting out of the towing vehicle, can release the latch, set the brakes and keep the brakes locked on the trailer.

Now, turning to FIGS. 2 and 3, consider the case where, as in FIG. 1 the trailer is empty and the latch has now been released and the brakes set on the wheels 26. If the towing vehicle is moved to the rear, the wheels will lock to the ground and the hitch frame pushing on the carrier frame at the hinge 42, 43 will cause the carrier frame to tilt as in FIG. 2 until the rear cross member 20 rests on the ground. If the vehicle is moved backwardly it will press on the frame at axis 42, 43 and will cause the frame to slide along the ground with the wheels locked, and resting at the point 20 and the wheels. Moving backwardly, the cross member 20 at the rear will lock under the roll of hay indicated by numeral 48, FIG. 2. Further backward movement of the hitch frame 14 will cause the carrier frame 16 to rotate about the point 20 and to fall over the bale of hay 48 as in FIG. 3. The bail 30 will rotate about the axis 31 due to its weight and will fall into the position shown in FIG. 3. Now, by pulling forward on the hitch frame 14 and rotating the carrier frame about the point 20, the bail 30 will catch under the back of the bale of hay, and cause it to be lifted, and to fall into the carrier frame 16 as the frame returns to the position of FIG. 2.

With the wheels still locked and the carrier frame in the position shown in FIG. 2, pulling on the hitch frame 14 will cause the frame 16 and the bail to rotate about the wheel 26 (since the wheels are locked) and come into a horizontal position. As the carrier frame becomes horizontal the latch plate 22 with its leading edge 73 will unlatch the bar 70 at the point 72, permitting it to move to the front under the influence of spring 74, and will permit the operating member 36 to move to the rear, releasing the brake, and the latch plate 52 will latch under the transverse bar 50, latching the carrier frame to the hitch frame. The entire apparatus is now locked into a single rigid unit and the wheels are unbraked ready for travel down the road.

In FIGS. 5, 6, and 7 are shown three views of another embodiment of the apparatus of FIGS. 1, 2 and 3 in which the wheel axle 24 instead of being supported on a rigid framework 25 is supported by a pair of rods 80 which are hingedly fastened to the carrier frame by pivot means 81. There is a linkage member 82 which attached to the rods 80 at hinge points 86 (FIG. 8). The members 82 are hingedly fastened at point 84 to the hitch frame 38. In the traveling position shown in FIG. 5, the member 82 locks the rods 80 in a substantially vertical position. However, as the loading operation takes place, as described in relation to FIGS. 2 and 3, as the hitch frame 38 rotates in a clockwise direction with respect to the carrier frame 16 shown by arrow 83, the linkage member 82 moves toward the rear, and the rod members 80 fold up in clockwise direction essentially into the plane of the carrier 16, the wheels moving toward the carrier and by particular design they are lifted off the ground, as shown in FIG. 7 so that the frame 16 is resting on the ground on the rear edge 20A, and can be positioned over the bale of hay as in FIG. 3.

The rear transverse member 20 of the frame 16 can be a skid type of surface that will slide along the surface of the ground, or it can be a roller 20A as shown in FIG. 6, or other similar means, which will permit the frame in the position of FIG. 2 to move backwardly. The feature of FIGS. 5, 6 and 7 permit lifting the wheels so that the entire contact of the frame is at the bar or roller 20A. Bumpers 73 and 75, as shown in FIG. 7, can be provided for limiting the rotation of the hitch frame 14 with respect to the carrier frame 16 to any selected value.

Another feature of the invention is shown in FIGS. 11, 12 and 13. This has to do with control of the bail 30. In the traveling position the bail is in a horizontal plane leading in the forward direction. The only time it is desired to have the bail fall toward the rear is when a bale is being loaded. Consequently, it is part of this invention to provide a locking member 90 which is hinged at the point 92 and can be rotated in a counter-clockwise direction by means of the chain 22A and spring 88 so that the lip 94 can rotate into the position of FIG. 12 and lock movement of the bail 30. Therefore, so long as the load of the bail 48 is on the carrier frame, the bail 30 is locked in forward position. Now, when it is desired to unload the bale the carrier frame can be rotated in accordance with the procedures of FIGS. 2 and 3 to a position such as that shown in FIG. 13. Since the bail 30 is locked by means of the lip 94 on the locking lever 90, held there by the weight of the locking member itself, there is no danger that the bail will fall to the left and catch around the bale as it is in FIG. 3. Therefore, the bale will be free to fall out of the frame 16 and be unlocked from the position of the frame shown in FIG. 13.

Referring now to FIGS. 9 and 10 there is shown an alternate mechanism for controlling the position of the bail 30. This comprises a crank arm 99 on the axis of the bail 30, which rotates about the axis 31. The crank arm 99 has a pin portion 98 which slides freely in a slot 100 in an arm 97 which is hinged at point 96 in the member 82. In the traveling position shown in FIG. 9, the point 96 is displaced from the frame 16 and the crank arm 98 is caught in the upper end 101 of the slot 100, and is rotated in a clockwise direction so that the bail 30 will rotate to the right and fall into the position 30, which is the traveling position. When it is intended to load the bale of hay and the carrier is pushed into the position shown in FIG. 7, the point 96 would move closer to the frame 16 and the bottom end 102 of the slot 100 would push on the crank arm 98 and cause it to rotate around to the position 30' shown in FIG. 9. Thus, the bail can be rotated from traveling to operating position in the loading operation by means of a mechanical linkage such as shown in FIGS. 9 and 10, or it can be done by manual means operating by hand directly at the arm 32, or it can be rotated by means of a tension member connected to the counterweight 32 so that the bail can be rotated to the rear at any selected time in the loading position or it can be held in a traveling position as desired.

Modifications of the invention include a bale cradle and carrier frame of U-shape design having at least a forward and side frame, open at the rear. The bale supports could extend from side to side. Electrical brakes for the wheels of the carrier are also contemplated and could be operable independent of the latch mechanism, for example by a separate switch inside the cab of the pulling vehicle.

While the invention has been described with a certain degree of particularity it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. A carrier for large cylindrical bales of hay comprising:
   a. a carrier frame means;
   b. cradle means to support said bale inside and surrounded by said carrier frame means;
   c. means to pivotally support said carrier frame means on a wheeled axle;
   d. hitch frame means pivotally supported to said carrier frame contiguous to the front edge of said carrier frame means;
   e. said hitch frame means adapted to be attached to a towing vehicle;
   f. latch means for releasably connecting said carrier frame means to said hitch frame means;
   g. bail means attached to the upper part of said carrier frame means and rotatably supported about an axis parallel to said wheeled axle to encircle said bale; and
   h. brake means for said wheels; and operating lever means interconnecting said latch means and said brake means to release the connection between said carrier frame means and said hitch frame means and simultaneously set and hold brake means until said carrier frame means and said hitch frame are reconnected.

2. The carrier means as in claim 1 including means to position said bail forward of its axis while said carrier is traveling; and rearward of its axis when said bale is being lifted into said carrier frame means.

3. The carrier means as in claim 2 in which said means to position said bail comprises counterweight means.

4. The carrier means as in claim 2 in which said means to position said bail comprises linkage means responsive to said hitch frame means.

5. The carrier means as in claim 1 including means on the rear edge of said carrier frame means to permit said frame means to move along the earth when said frame means rests on its rear edge on the earth.

6. The carrier means as in claim 5 in which said means on said rear edge comprises skid means.

7. The carrier means as in claim 5 in which said means on said rear edge comprises roller means.

8. The carrier means as in claim 1 including tension means attached to said operating lever means whereby said operating lever means can be operated from a towing vehicle to which said hitch frame is connected.

9. The carrier means as in claim 1 in which said means to support said carrier frame means from said axle means comprises bar means hinged to the underside of said carrier frame means and linkage means between said axle means and said hitch frame means; whereby when said hitch frame means rotates in a clockwise direction with respect to said carrier frame means, said axle support bar means will rotate in a clockwise direction, and said axle will lie along the underside of said carrier frame means, and said wheels will be lifted off the ground.

10. The carrier means as in claim 1 including means responsive to the weight of said bale in said means to support said bale, to lock said bail in its forwardly directed position.

* * * * *